United States Patent
Choi

(10) Patent No.: US 6,784,629 B2
(45) Date of Patent: Aug. 31, 2004

(54) DUAL FUNCTION SOLID STATE RELAY

(76) Inventor: Sang J. Choi, 2425 W. 183rd St., Homewood, IL (US) 60430

( * ) Notice: Subject to any disclaimer, the term of this patent is extended or adjusted under 35 U.S.C. 154(b) by 18 days.

(21) Appl. No.: 10/227,655

(22) Filed: Aug. 26, 2002

(65) Prior Publication Data

US 2004/0036433 A1 Feb. 26, 2004

(51) Int. Cl.[7] .................................................. H02P 1/54
(52) U.S. Cl. ...................................... 318/34; 318/285
(58) Field of Search .......................... 318/34, 285, 280, 318/28, 265, 286, 294, 469, 281, 282, 293; 327/110

(56) References Cited

U.S. PATENT DOCUMENTS

| | | | | |
|---|---|---|---|---|
| 4,562,387 A | * | 12/1985 | Lehnhoff | 318/285 |
| 5,815,040 A | * | 9/1998 | Barbetta | 330/264 |
| 6,386,031 B2 | * | 5/2002 | Colarelli et al. | 73/462 |
| 6,400,190 B1 | * | 6/2002 | Lacombe | 327/110 |
| 6,414,549 B1 | * | 7/2002 | Barbetta | 330/264 |
| 6,426,600 B1 | * | 7/2002 | Lautzenhiser et al. | 318/34 |

* cited by examiner

Primary Examiner—Karen Masih

(57) ABSTRACT

A dual function solid state relay for a motor control includes four solid state switches and 6 terminals, wherein a set of 2 switches are for up operation allowing a current flow through a load in one direction and the other set of 2 switches are for down operation allowing the current flow through the load in the opposite direction. Out of 2 switches during up operation, one switch connects V+ to one end of the load and the other switch connects a Ground to the other end of the load. During down operation mode, the operation is similar to the up operation except that the voltage polarities connected to the each end of the load is reversed. Out of 6 terminals, 2 are for up and down inputs and 2 are for the outputs to the load and the remaining 2 are for V+ connection and Ground connection. In another embodiment, with the addition of a input signal control circuit to the dual function solid state relay, only one input signal from a push button switch is required for the both, up and down, operations.

6 Claims, 4 Drawing Sheets

DUAL FUNCTION SOLID STATE RELAY

FEDERALLY SPONSORED RESEARCH OF DEVELOPMENT

Not applicable.

MICROFICHE APPENDIX

Not appendix.

BACKGROUND OF THE INVENTION

This invention is regarding to automotive accessory or low voltage industrial motor control relays; door lock relay, power window control relay, power seat control relay, antenna control relay, cassette motor control relay, disk control motors, and more. However, for the illustrative and clarity purpose, a general purpose relay control system is explained as an example with up and down input signal notation. In some other applications, these could be right and left operations. Therefore, this invention is not limited only to a specific function, but extended to all relay applications described previously.

In a prior art (conventional) dual function motor control system, 2 separate relays, one for up and the other one for down functions, are assembled together in a package as a dual functional relay device. One relay is activated by the UP input signal from a UP switch and the other relay is activated by the DOWN input signal from a DOWN switch.

The conventional electromechanical relay has several mechanical metal contacts, which are prone to be corroded because of heavy current passing through the contacts when the relay is energized.

FIG. 2 shows the structure of a prior art (conventional) reversible motor control relay circuit. If either up or down switch is pressed, heavy current is flowing through the respective coil, energizing the relay. The coil electron current is flowing from the relay Ground (1), through the coil, point (5), up switch contact, 20A fuse, to V+. The up function motor current path starts from the Ground (1), Ground side contact of the down relay, point (3), reversible control motor (150), point (4), activated side of the up relay, 30A fuse, to V+.

The manufacturing process for a mechanical device is, in general, more difficult than that of an electronic device. For a prior art (conventional) motor control relay, it requires quite heavy coil current to activate the relay.

To improve such an inherent deficiencies of the electromechanical relay, the solid state relay has been developed for many different applications. However, the most of them are functionally limited to single pole single throw switch mode. In general, those used in computer related system are low power and low voltage relays and those used in industrial application are mostly high voltage high power solid state relays. Most automotive relays should be capable of controlling devices with low voltage and high current load. Therefore, the products of this invention can be mostly utilized for the automotive and also for computer applications.

SUMMARY OF THE INVENTION in a industrial application of a relay device, it is a general trend to replace a electromechanical relay to a solid state relay because the latter has the features of the better durability, less power consumption and easier manufacturing process. As explained in the background section, the operation of a general purpose relay control system is described for the illustrative purpose only and its application is extended to all applicable accessory control devices. With the advantageous solid state internal structure, a dual function solid state relay of the present invention has the same functionality and external connection features as those of the conventional electromechanical relays for the respective operations. The product of the present invention can easily replace electromechanical dual function relays without any modification for the interconnections with the existing related devices or circuits.

The new invention provides 6 terminals, 2 for the up and down input signals, 1 for V+ connection, and 1 for Ground connection, and 2 for the output connections to the reversible motor. The internal structure of the new invention includes 4 semiconductor switches, 2 for the up function and remaining 2 for the down function. Each function requires 2 semiconductor switches, 1 for power supply connection, 1 for Ground connection to the control motor of the respective function. Each semiconductor switch is made of solid state devices, either transistors MOSFETs, SCRS, or combination of the several those devices. The arrangement of the solid state devices of a semiconductor switch is either Darlington structure, SCR structure, driver and power transistor combination, or single power device arrangement. With the addition of the input signal control circuit to the dual function solid state relay device, it produces the composite device of the reversible solid state control device. Two types of special semiconductor switches can be utilized for a solid state relay where low power supply is available and high power is required. One type is to connect V+ to a load and the other one is to connect Ground terminal to the load. When activated, those switches drop much less voltage across the switch devices than SCR or Darlington devices. Accordingly, they consume much less powers and generate less heat.

BRIEF DESCRIPTION OF THE DRAWING

The present invention will be more clearly appreciated from the following detailed descriptions of the present embodiments, with reference to the accompanying drawings, in which.

DETAILED DESCRIPTION OF THE PREFERRED EMBODIMENT

Figure 2:
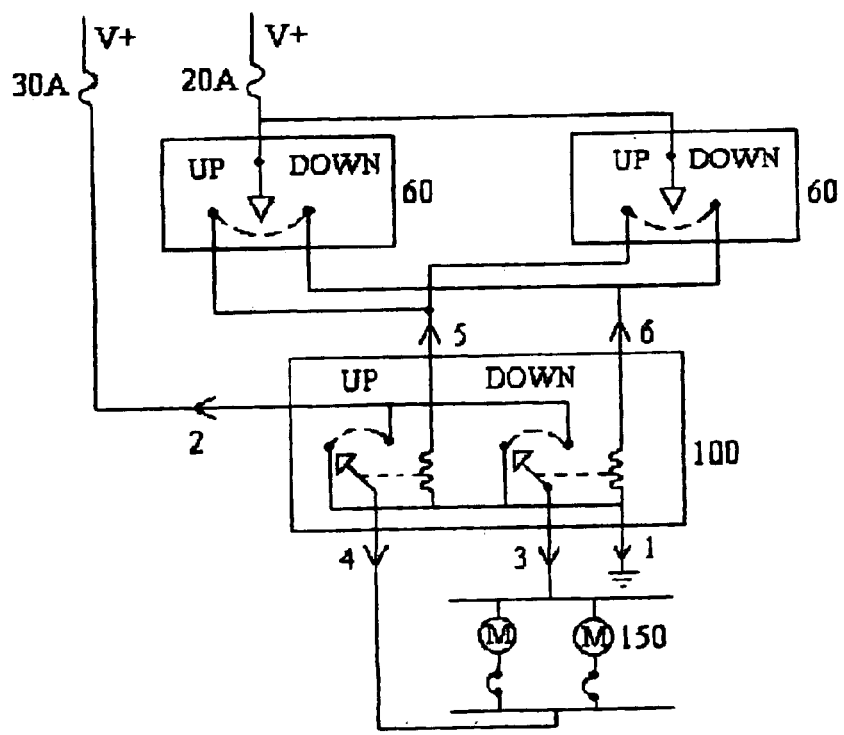
FIG. 2 is a wiring diagram of a prior art (conventional) dual function relay system.

FIG. 2 shows a prior art (conventional) motor control system. According to the drawing, the function and structure of the prior art can be easily appreciated and are fully explained in the background section of this embodiment.

Figure 1:
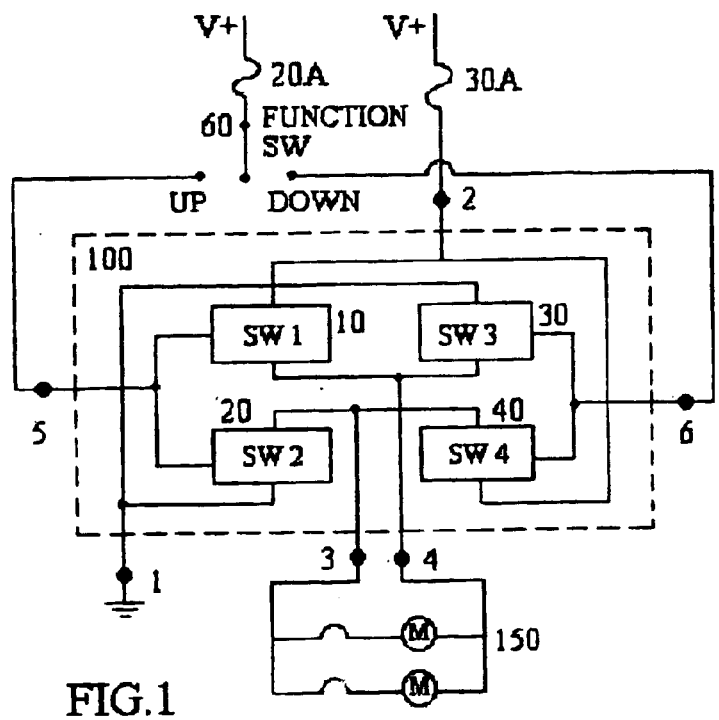
FIG. 1 is a block diagram showing the present embodiment of a dual function solid state relay.

FIG. 1 represents the structural diagram of this dual function solid state relay.

Figure 3:
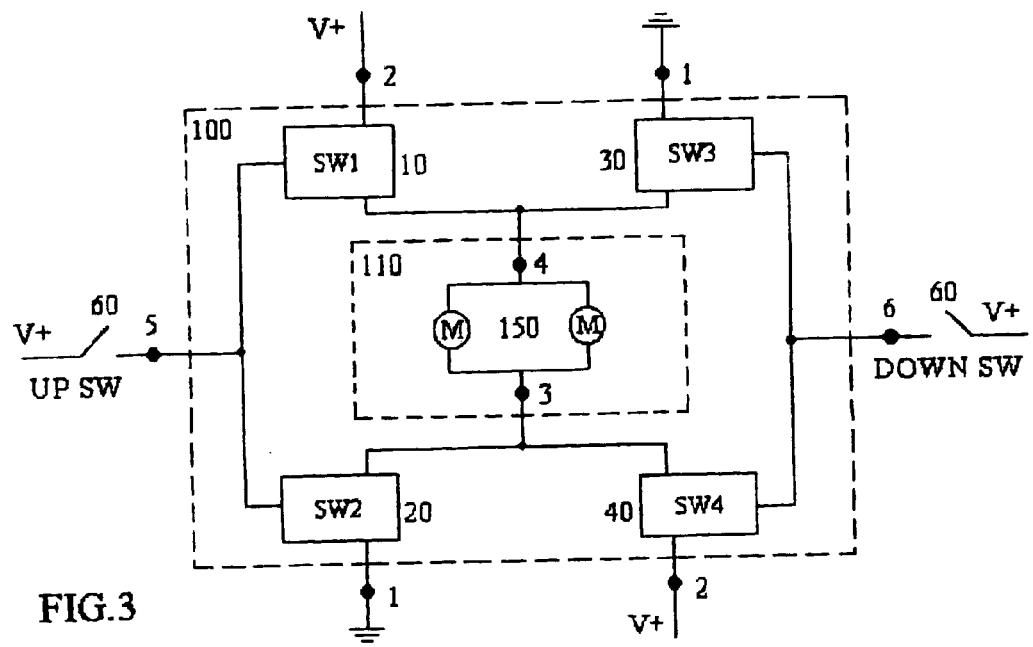
FIG. 3 is another block diagram, which is same as FIG. 1 in terms of functionality and numbering scheme. This figure will help in appreciating the function of the dual function solid state relay.

FIG. 3 is shown in aiding to follow the functional explanation of the present embodiment. Therefore, for the structural view of this embodiment, refer to FIG. 1, and for the functional understanding, refer to FIG. 3. For both, FIG. 1 and FIG. 3, the numbering schemes are the same. Inside the dotted line (100) represents the block diagram of 4 semiconductor switches, (SW1)(10), (SW2) (20), (SW3) (30), and (SW4) (40), which represent the dual function solid state relay portion of the present invention. One terminal of each of (SW2) (20) and (SW3) (30) are together connected to a Ground (1), another terminal of each of (SW1) (10) and (SW4) (40) are together connected to V+ (2), one output of each of (SW1) (10) and (SW3) (30) are connected to one side of Load motor (4), and the other output of each of (SW2) (20) and (SW4) (40) are connected to the other side of Load (3). When the function switch (60) is at the up position, point (5) caries V+ to the control inputs of (SW1) (10) and (SW2) (20) and activates them, connecting V+ to point (4) through (SW1) (10), and Ground (1) to point (3) through (SW2). At this time, the complete electron current path is from the Ground (1), through (SW2) (20), point (3), the function control motors (150), point (4), (SW1) (10), 30A fuse, to V+. Therefore, during the UP operation, the current flows from point (3) toward point (4) through the function control motor. When the function switch (60) is flipped to the DOWN position, point (6) carries V+ voltage and activates (SW3) (30) and (SW4) (40), connecting V+ to point (3) through (SW4) (40), and the Ground (1) to point (4) through (SW3) (30). At this time, the complete electron current path is from the Ground (1), through (SW3) (30), point (4), the function control motors (150), point (3), (SW4) (40), 30A fuse, to V+. During the DOWN operation, the current flows from point (4) toward point (3) through the function control motor. It is evident that the current directions through the function motor are just opposite between the UP operation and DOWN operation. This proves that the four switching means provide proper voltage polarities for both up and down operations.

Figure 4:
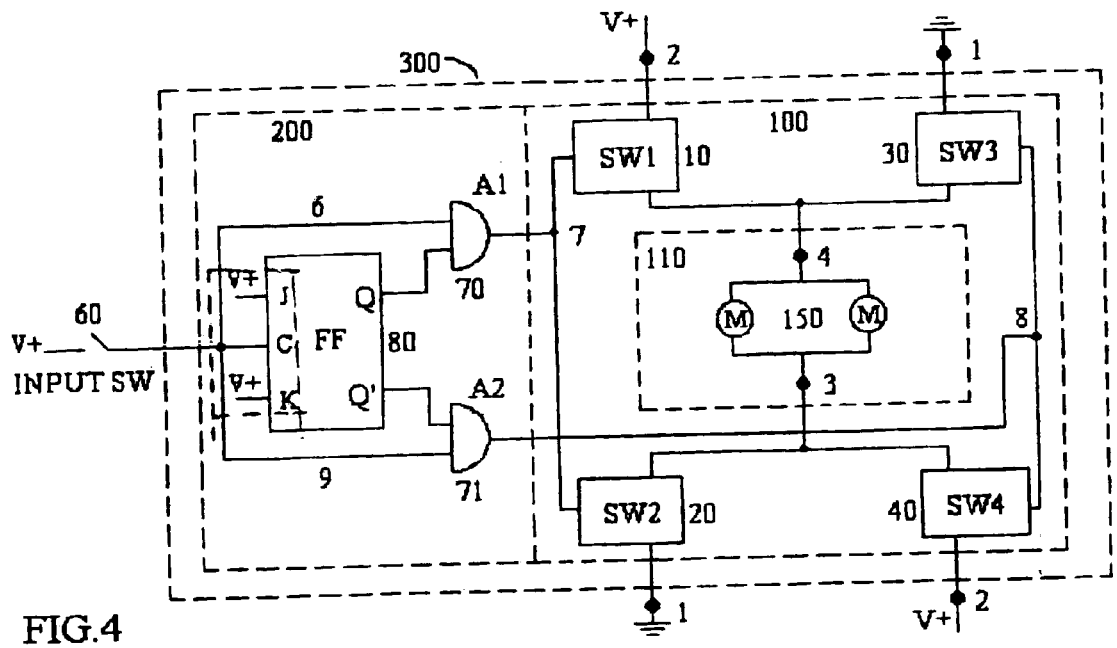
FIG. 4 is a block diagram of another embodiment of the reversible solid state control device, which is the composite of the dual function solid state relay and input signal control circuit.

FIG. 4 shows a reversible solid state control system (300), which includes input signal control circuit (200), and dual function solid state relay (100) that has been described in the previous section in detail. The input SW (60) is connected to (C) input of FLIP FLOP (80), (J) and (K) inputs are connected to V+ to function as toggle mode, inputs of (A1)(70) is connected to (Q) output of (80) and to input SW (60), inputs of (A2)(71) is connected to (Q') output of FLIP FLOP (80) and to input SW (60), the output of (A1)(70) is connected to (SW1) (10) and (SW2) (20), the output of (A2)(71) is connected to (SW3) (30), and (SW4) (40), the internal inter-connection of (100) is the same as that of FIG. 3, and FIG. 1. Every time the input SW (60) is pushed, positive pulse is applied to the input of the FLIP FLOP (80), which, in turn, toggles the output states on the (Q) and (Q'). Between (Q) and (Q') outputs, one is high level and the other one is low level for any given input. For the next arrived input pulse, the states of (Q) and (Q') are changing to the opposite states respectively from the previous ones. According to the diagram shown, (Q) output is used as up control signal and (Q') output is used as down control signal. For an example, if the input SW (60) is momentarily pressed, the positive pulse will trigger the FLIP FLOP, causing (Q) output high (assumption), and (Q') output low. The output of (A1) (70) is also high, and activates (SW) (10) and (SW2) (20) by allowing the current flow through the function control motor (150). The electron current path starts from Ground (1), through (SW2) (20), point (3), the function control motors (150), point (4), (SW1) (10), to V+. If the same SW (60) is pushed again momentarily, it toggles the outputs of the FLIPFLOP (80), changing (Q) output to low level, and (Q') output high level, accordingly (A2) (71) output is high level, point (8) is high level, and (SW3) (30) and (SW4) (40) are activated. The action allows down function current flow through the function control motor (150), starting from Ground (1), (SW3) (30), point (4), the control motors (150), point (3), (SW4) (40), to V+. This description explains that the UP function current flow path through the control motor (150) is just opposite from that of the DOWN function operation. The purpose of two AND gates (A1, A2) are as following; the input signal control circuit (200) is so designed that the control motor is moved to UP position by default upon the starting the car. At this time, (Q) output is at high level and (Q') output is at low level. However, both outputs of (A1) (70) and (A2) (71) are at low level because the input SW (60) remains open state. The input SW (60) is momentarily closing switch. If the function is to be down, press the input switch (60), then (Q) output is low and (Q') output is high. While the door SW (60) is being pressed, point (6) and point (9) maintains high levels, affecting (A1) output low and (A2) output high, activating (SW3) (30) and (SW4) (40). This action will move the motor to DOWN position. While in the DOWN position, release the input switch, then both AND gate outputs are low levels and deactivate (SW3) (30), (SW4) (40), causing all 4 semiconductors switch outputs floating.

Figure 5:
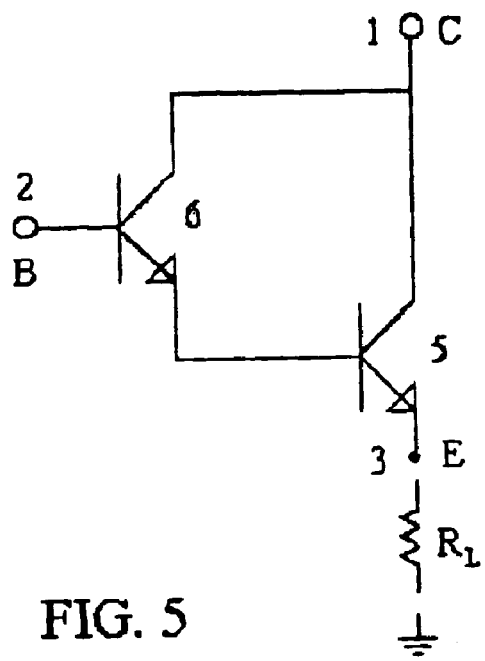
FIG. 5 shows a Darlington configuration, which has high current gain.

FIG. 5 is a typical Darlington transistor configuration, which provides high current gain and is employed in many high gain amplifier application. However, it can be adopted for the power switching application in a circuit which has high power supply voltage and demands high current output.

Figure 6:
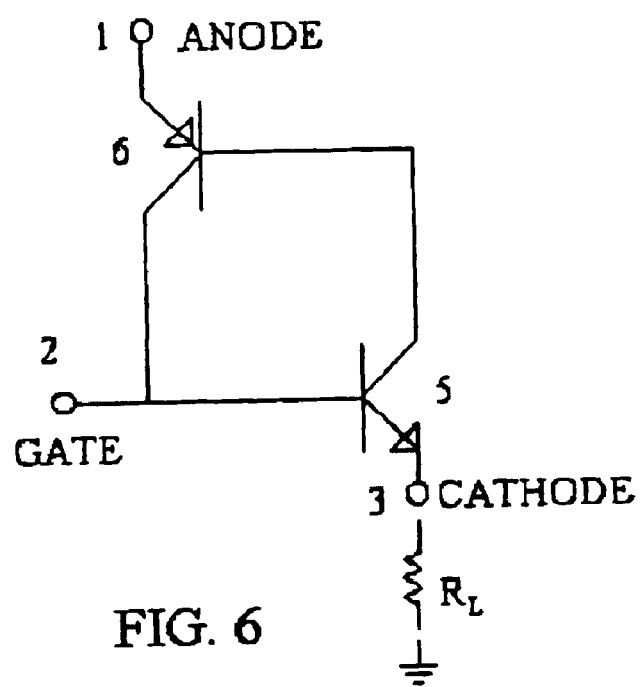
FIG. 6 shows SCR configuration, which has high current capability.

FIG. 6 is a typical SCR configuration, which is capable of high current gain and high output current. It drops approximately 1 volt across the ANODE (1) and the CATHODE (3), but can be used in a switching application, where power supply voltage is high.

Figure 7:
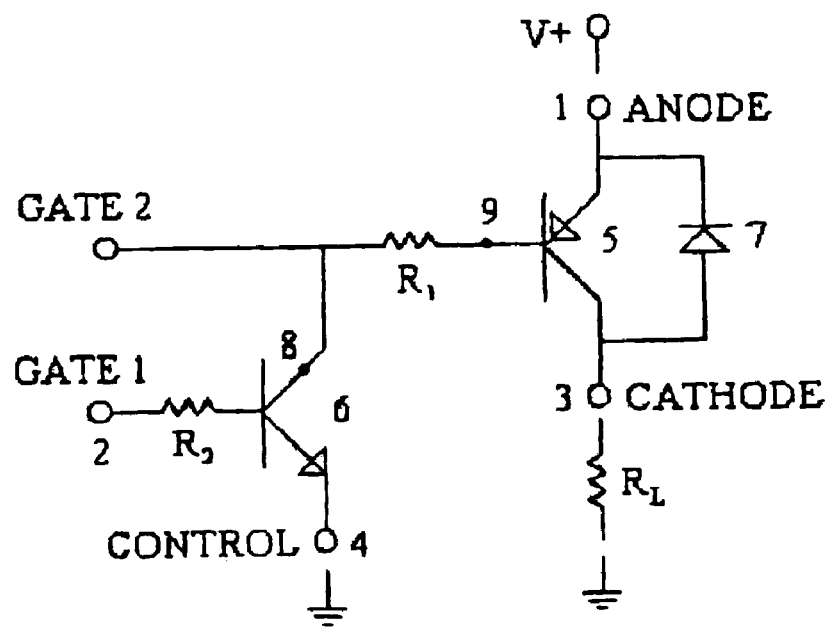
FIG. 7 shows a positive connection switch which is used where low voltage drop is required across the switch.
Figure 8:
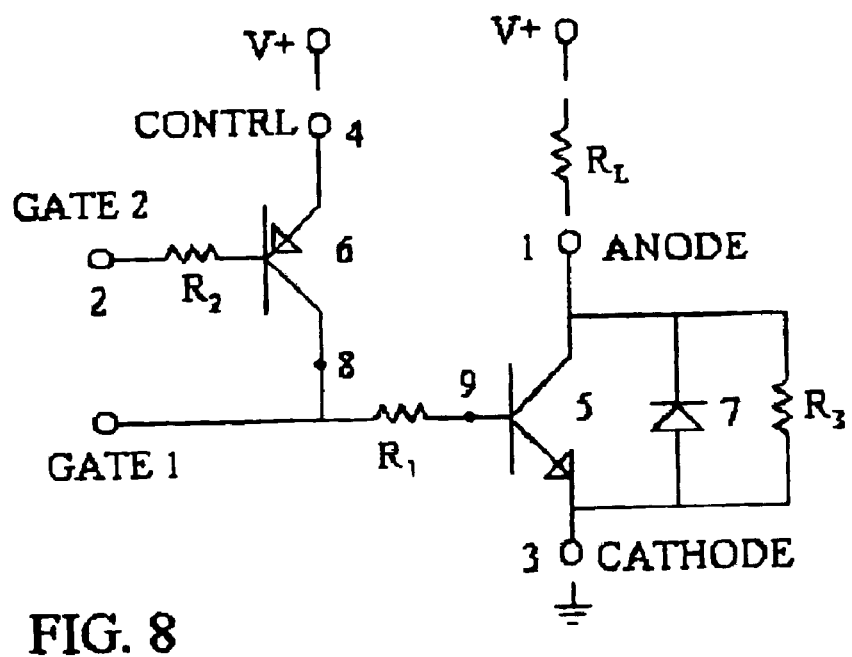
FIG. 8 shows a negative connection switch used where low voltage drop is required across the switch.
Figure 3:
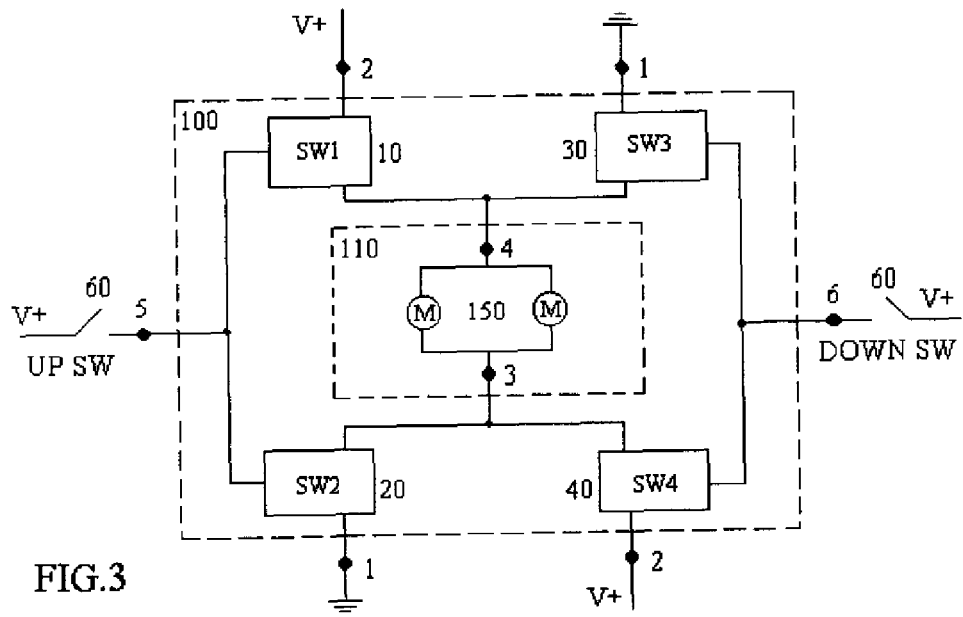
Figure 4:
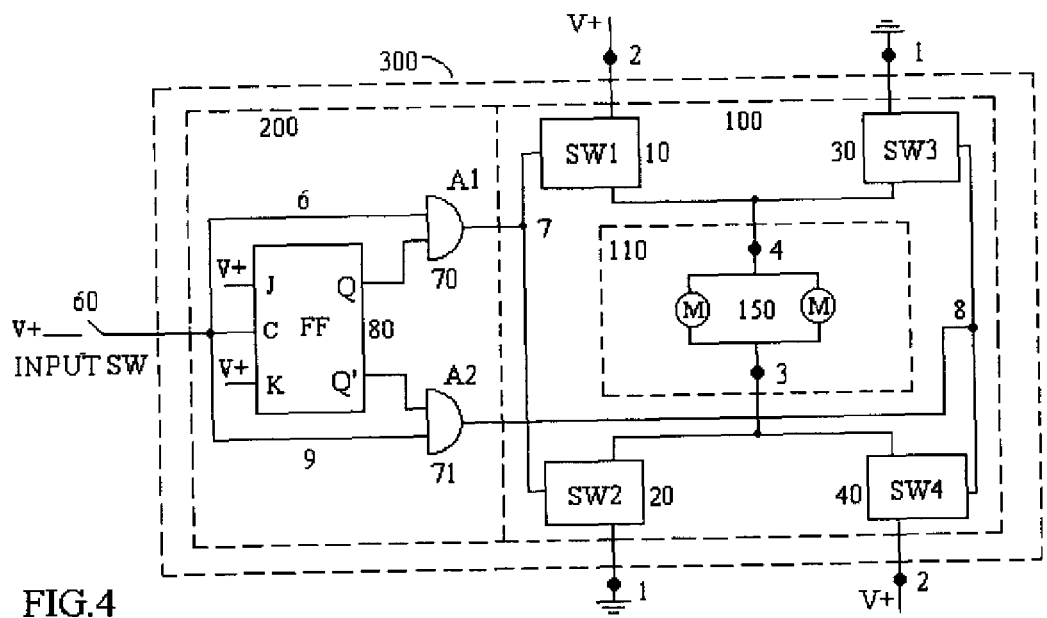
Figure 7:
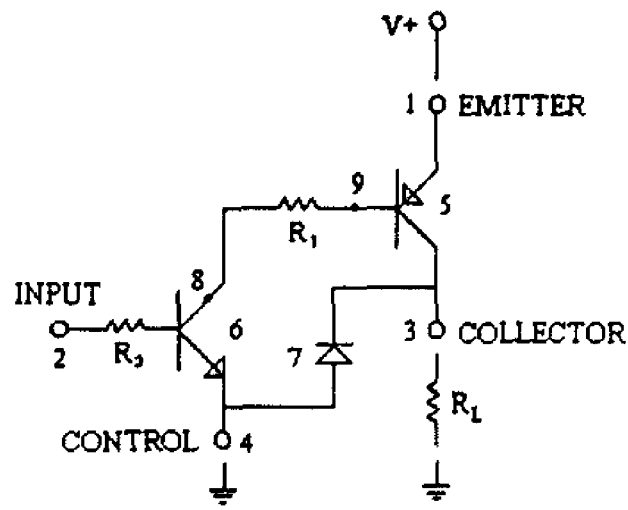
Figure 8:
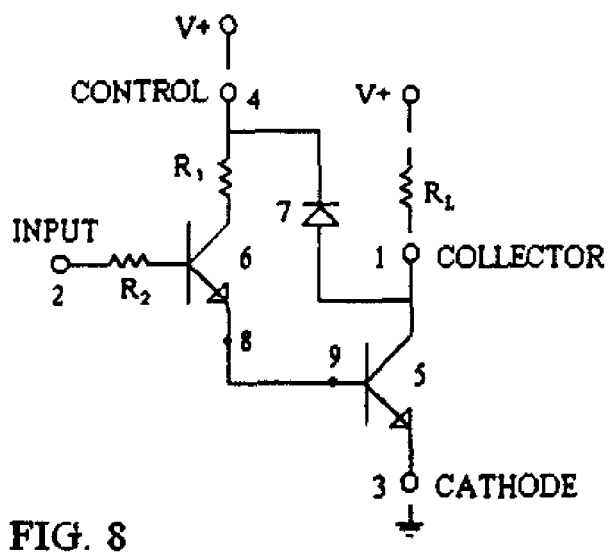

FIG. 7 and FIG. 8 represent low voltage high power switches.

FIG. 7 is a positive terminal connection switch, which connects V+ terminal to a motor. This device drops very low voltage across it, and connects the remaining power supply voltage to a load circuit. The switch comprises a NPN driver (6), a PNP power transistor (5), a clipping diode (7), current limiting resistor ($R_1$), a base resistor ($R_2$), and 4 terminals, $R_2$ is connected to the base of NPN driver (6), the collector of NPN driver (6) is connected to $R_1$, the other side of $R_1$ is connected to the base (9) of power transistor (5), the COLLECTOR (3) of power transistor (5) is connected to a Load, and the clipping diode (7) is connected between the COLLECTOR (3) of power transistor (5) and the CATHODE (4) of NPN driver (6), the Emitter (1) of the power transistor (5) is connected to V+. The input terminal is connected to the base of the driver through a current limiting resistor $R_2$. When a positive input is applied to the driver transistor, NPN transistor (6) drives the PNP silicon power transistor (5) with high driving current, closing the switch and connecting the V+ to a load circuit $R_L$. Terminal (4) is the unique element for this configuration. The terminal is connected to a Ground. The current limiting resistor (R1) is connected between point 8 and point 9 with terminal (4) connected directly to the Ground. Because of this arrangement, the voltage drop between the EMITTER (1)

and COLLECTOR (3) of the power transistor (6) is very small. The clipping diode (7) is for clipping a negative voltage spike generated by the load, limiting the voltage on point (3) zero volt when the switch is turned off.

FIG. 8) is a negative connection switch. This device drops very small voltage across it, and connects a Ground to a Load circuit. This switch comprises a NPN driver transistor (6), a NPN power transistor (5), current limiting resistors ($R_1$), a base resistor ($R_2$), a clipping diode (7), and four terminals. $R_2$ is connected to the base of the driver (6), the collector of the driver (6) is connected to $R_1$, the other side of $R_1$ is connected to V+, the emitter (8) of the driver (6) is connected to the base (9) of power transistor (5), the COLLECTOR (1) of power transistor (6) is connected to a Load, the CATHODE of power transistor (6) is connected to a Ground, and the diode (7) is connected between the COLLECTOR (1) of the power transistor (5) and control terminal (4) which is connected to V+. The input terminal is connected to a current limiting resistor ($R_2$). When positive input is applied, NPN driver transistor (6) drives the NPN silicon power transistor (5) with high driving current, closing the switch and connecting the Ground to a load circuit. Terminal (4) is a unique element for this configuration. The terminal (4) is connected to a V+. The current limiting resistor ($R_1$) is connected between the collector of driver and terminal (4), which is connected directly to V+. Because of this arrangement, the voltage drop between the COLLECTOR (1) and CATHODE (3) of the power transistor (5) is very small. The diode (7), connected between collector of power transistor and terminal (4), is for clipping the high voltage spike generated by the load and preventing an oscillation across the load when the switch is turned off.

In its broader aspects, this invention is not limited to the specific embodiment illustrated and described. Those skilled in the art may make various changes and modifications without departing from the scope and spirit of the present invention. It is the expressed intention of this invention to embrace all such changes and modifications which fall within the scope of the described claims thereby.

What is claimed is:

1. A dual function solid state relay apparatus for controlling a reversible motor, comprising:
    four semiconductor switching means defined as first, second, third, and fourth switches, wherein
    functionally, first and second switches are for UP control function, and third and fourth switches are for DOWN control function,
    power connectionwise, first and fourth switches are for V+ connections for the respective functions, second and third switches are for GROUND connections for the respective functions; and
    six terminals, wherein the first terminal is for Ground connection, the second one is for V+ connection, the third one is for one polarity of power supply output, the fourth one is for the other polarity of power supply output, the fifth one is for the UP control input signal, and the sixth one is for the DOWN control input signal.

2. A dual function solid state relay apparatus according to claim 1, wherein two semiconductor switches for each function, in an application where power supply has a voltage constraint, are:
a) a positive connection switch, comprising:
    a power device, a PNP power transistor or a MOSFET, for connecting V+ to a load with a minimal voltage drop across the device;
    a driver for supplying sufficient current to drive the power device with the cathode of the driver connected directly to ground; and
    a clipping diode for filtering out a negative spike generated by the load and preventing an oscillation across the load;
b) a negative connection switch, comprising:
    a power device, a NPN power transistor or a MOSFET, for connecting GROUND to the load with a minimal voltage drop across the device;
    a driver for supplying sufficient current to drive the power device with the collector of the driver connected to V+ through a current limiting resistor; and
    a clipping diode for filtering out a positive spike generated by the load and preventing an oscillation across the load.

3. A positive connection and a negative connection switches according to claim 2, wherein the power device comprises: a SCR or a darlington transistor for both a positive connection and a negative connection switches in an application where power supply has no voltage constraint.

4. A reversible solid state control device for controlling a DC motor for both directions, UP and DOUN, with one INPUT SWITCH, comprising:
    a) four semiconductor switch means, defined as first, second, third, and fourth switches;
    b) five terminals, first terminal is for ground connection, second one is for V+ connection, third and fourth are for outputs to a load, and fifth one is for input signal connection; and
    c) an input signal control circuit, which comprises:
        a FLIP PLOP for producing two outputs, (Q) and (Q'), with one INPUT SWITCH connected to the FLIP FLOP; and
        two AND gates, first AND gate receives two inputs, (Q) and INPUT SWITCH signal, and produces UP control signal, second AND gate receives two inputs, (Q') and INPUT SWITCH signal, and produces DOWN control signal.

5. a reversible solid state control device according to claim 4, wherein two semiconductor switch means, the first switch and the second switch, are used for the up control function, the first switch is for providing the connection of V+ terminal to one end of the reversible control motor, the second switch is for providing Ground connection to the other end of the reversible control motor.

6. a reversible solid state control device of claim 4, wherein two semiconductor switch means, the third switch and the fourth switch, are used for the down control function, the fourth switch is for the connection of V+ terminal to one end of the control motor, the third switch is for Ground connection to the other end of the control motor.

* * * * *

UNITED STATES PATENT AND TRADEMARK OFFICE
CERTIFICATE OF CORRECTION

PATENT NO. : 6,784,629 B2
DATED : August 31, 2004
INVENTOR(S) : Choi

It is certified that error appears in the above-identified patent and that said Letters Patent is hereby corrected as shown below:

Please delete Drawings 4, 7 and 8 and substitute therefor the drawings consisting FIGS. 4, 7 and 8 as shown on the attached pages.

Signed and Sealed this

Fifth Day of April, 2005

JON W. DUDAS
*Director of the United States Patent and Trademark Office*